United States Patent
Yamamoto et al.

(10) Patent No.: US 11,173,859 B2
(45) Date of Patent: Nov. 16, 2021

(54) SYSTEM AND METHOD FOR PROVIDING VEHICLE OCCUPANT MONITORING

(71) Applicant: Honda Motor Co., Ltd., Tokyo (JP)

(72) Inventors: Stuart Masakazu Yamamoto, La Mirada, CA (US); Bryan Joe Hourt, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/740,002

(22) Filed: Jan. 10, 2020

(65) Prior Publication Data

US 2021/0213901 A1 Jul. 15, 2021

(51) Int. Cl.
| | | |
|---|---|---|
| B60R 21/015 | (2006.01) | |
| B60R 25/31 | (2013.01) | |
| E05B 81/78 | (2014.01) | |

(52) U.S. Cl.
CPC .......... B60R 21/0153 (2014.10); B60R 25/31 (2013.01); E05B 81/78 (2013.01)

(58) Field of Classification Search
CPC ...... B60R 21/0153; B60R 25/31; E05B 81/78
See application file for complete search history.

(56) References Cited

U.S. PATENT DOCUMENTS

| | | | |
|---|---|---|---|
| 7,091,823 B2 | 8/2006 | Ieda et al. | |
| 8,909,430 B2 | 12/2014 | Choi et al. | |
| 10,351,102 B2 | 7/2019 | Park | |
| 2007/0216517 A1* | 9/2007 | Kurpinski | B60R 25/245 340/5.72 |
| 2012/0106182 A1* | 5/2012 | Minter | E05B 41/00 362/501 |
| 2014/0361889 A1* | 12/2014 | Wall, II | G08B 21/025 340/539.11 |
| 2016/0101727 A1* | 4/2016 | Kwon | B60K 28/12 340/459 |
| 2017/0158186 A1* | 6/2017 | Soifer | B60H 1/00742 |
| 2018/0130327 A1* | 5/2018 | Rogers | G08B 21/0222 |
| 2019/0359172 A1* | 11/2019 | Galicia Rodríguez | B60R 25/33 |
| 2020/0071967 A1* | 3/2020 | Adams | G06K 9/00838 |

FOREIGN PATENT DOCUMENTS

| | | |
|---|---|---|
| JP | 2004351979 A | 12/2004 |
| JP | 2007115130 A | 5/2007 |
| JP | 2010013077 A | 1/2010 |
| JP | 2010239587 A | 10/2010 |
| KR | 200154895 Y1 | 8/1998 |

* cited by examiner

Primary Examiner — Thomas D Alunkal

(74) Attorney, Agent, or Firm — Stinson LLP

(57) ABSTRACT

Vehicle occupant monitoring systems and methods detect that an outer handle of the vehicle is used to open a door, and determine a key fob state of the vehicle. On condition that the key fob state of the vehicle is undetected, at least one type of alert is transmitted to a mobile device associated with the vehicle.

20 Claims, 4 Drawing Sheets

SYSTEM AND METHOD FOR PROVIDING VEHICLE OCCUPANT MONITORING

BACKGROUND

One or more people may enter a vehicle when its owner or operator is not in or near the vehicle. For example, a door of the vehicle may be unlocked or left open. In some cases, an occupant of the vehicle may not be able to communicate their presence to the owner or operator. For example, the occupant may be in a state of sleep, a child, or a pet. In such cases, the owner or operator of the vehicle may not be aware of the presence of one or more occupants of the vehicle.

SUMMARY

In one aspect, a computer-implemented method provides vehicle occupant monitoring within a vehicle. The method includes detecting that an outer handle of the vehicle is used to open a door, and determining a key fob state of the vehicle. On condition that the key fob state of the vehicle is undetected, the method further includes transmitting at least one type of alert to a mobile device associated with the vehicle.

In another aspect, a vehicle occupant monitor system is provided. The vehicle occupant monitor system includes a plurality of sensors including a door sensor and a key fob sensor, a transmitter configured to communicate with a mobile device associated with the vehicle, a processor, and a memory storing instructions. When the stored instructions are executed by the processor, the processor is caused to detect a door signal associated with the door sensor and communicate with the key fob sensor to determine a key fob state of the vehicle. The door signal is indicative of an outer handle of the vehicle being used to open a door. On condition that the key fob state of the vehicle is undetected, the process is further caused to communicate with the transmitter to transmit at least one type of alert to the mobile device associated with the vehicle.

In yet another aspect, a non-transitory computer readable storage medium is provided. The non-transitory computer readable storage medium stores instructions that, when executed by a computer, cause the computer to detect a door signal indicative of an outer handle of the vehicle being used to open a door and determine a key fob state of the vehicle. On condition that the key fob state of the vehicle is undetected, the computer is further caused to transmit at least one type of alert to a mobile device associated with the vehicle.

Other objects and features will be in part apparent and in part pointed out hereinafter.

BRIEF DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative examples when read in conjunction with the accompanying drawings, wherein:

Corresponding reference characters indicate corresponding parts throughout the drawings.

DETAILED DESCRIPTION

Figure 1:
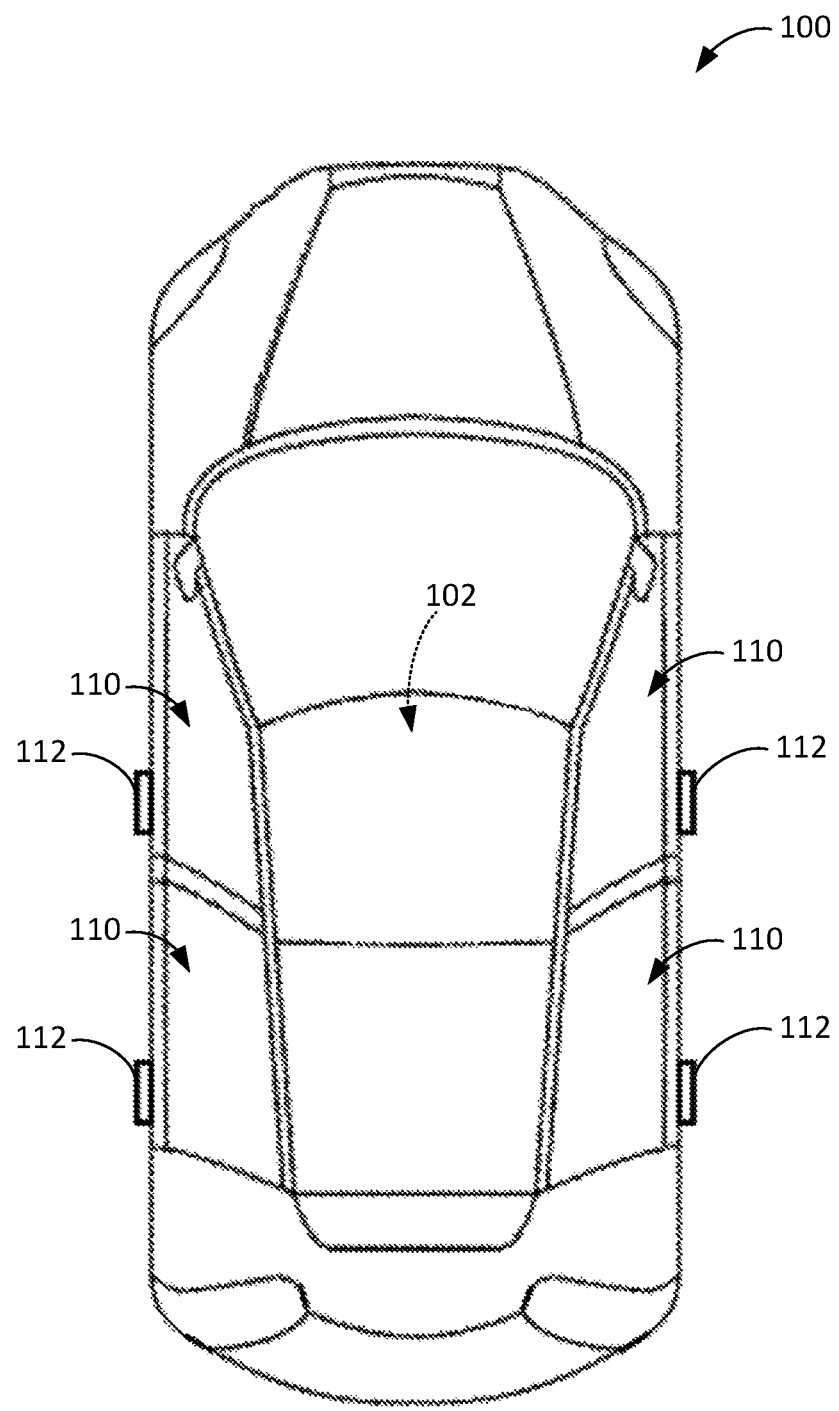
FIG. 1 is a schematic view of an operating environment of a vehicle occupant monitor (VOM) system for providing vehicle occupant monitoring of a vehicle according to some examples of the present disclosure.

The subject matter described herein relates to monitoring systems and, more particularly, to vehicle occupant monitoring. Examples of the disclosure include one or more door sensors that detect when one or more doors are opened or closed and one or more key fob sensors that detect when one or more key fobs are located in or near the vehicle. If a door is opened when an owner or operator of the vehicle is not in or near the vehicle, an alert or notification may be transmitted to a mobile device associated with the owner or operator of the vehicle. In this manner, the owner or operator is notified of a potential breach of the vehicle and/or a potential occupant of the vehicle who is otherwise unable to communicate their presence to the owner or operator. Examples described herein are configured to operate whether or not an anti-theft system is armed.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with predetermined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 200%. In other cases, the value or level of X could be a value in the range between 2 and 20. In still other cases, the value or level of X may not be a numerical value, but could be associated with a given discrete state, such as "not X", "slightly x", "x", "very x" and "extremely x."

I. System Overview

Referring now to the drawings, which are provided for purposes of illustrating one or more examples and not for purposes of limiting the same, with reference to FIG. 1, an example vehicle 100 includes an interior passenger space or cabin 102 configured to accommodate one or more occupants. The vehicle 100 includes one or more doors 110 that allow the occupants to enter into and leave from the cabin 102. Example doors may include a driver side front door, a passenger side front door, one or more rear doors, and/or a tailgate (not shown).

In some examples, the doors 110 include one or more door handles 112 for opening and/or closing each of the respective doors 110. Door handles 112 disposed outside the cabin 102 (e.g., "exterior door handles") may be used to allow one or more passengers to access or enter the cabin 102, and door handles 112 disposed inside the cabin 102 (e.g., "interior door handles") may be used to allow one or more passengers to exit the cabin 102. In some examples, the doors 110 may be moved between a locked state and an unlocked state. While the cabin 102 is described and shown to include four doors 110 and four door handles 112, one of ordinary skill in the art would understand and appreciate that the vehicle 100 described herein may include any quantity of doors and/or door handles in various arrangements.

Figure 2:
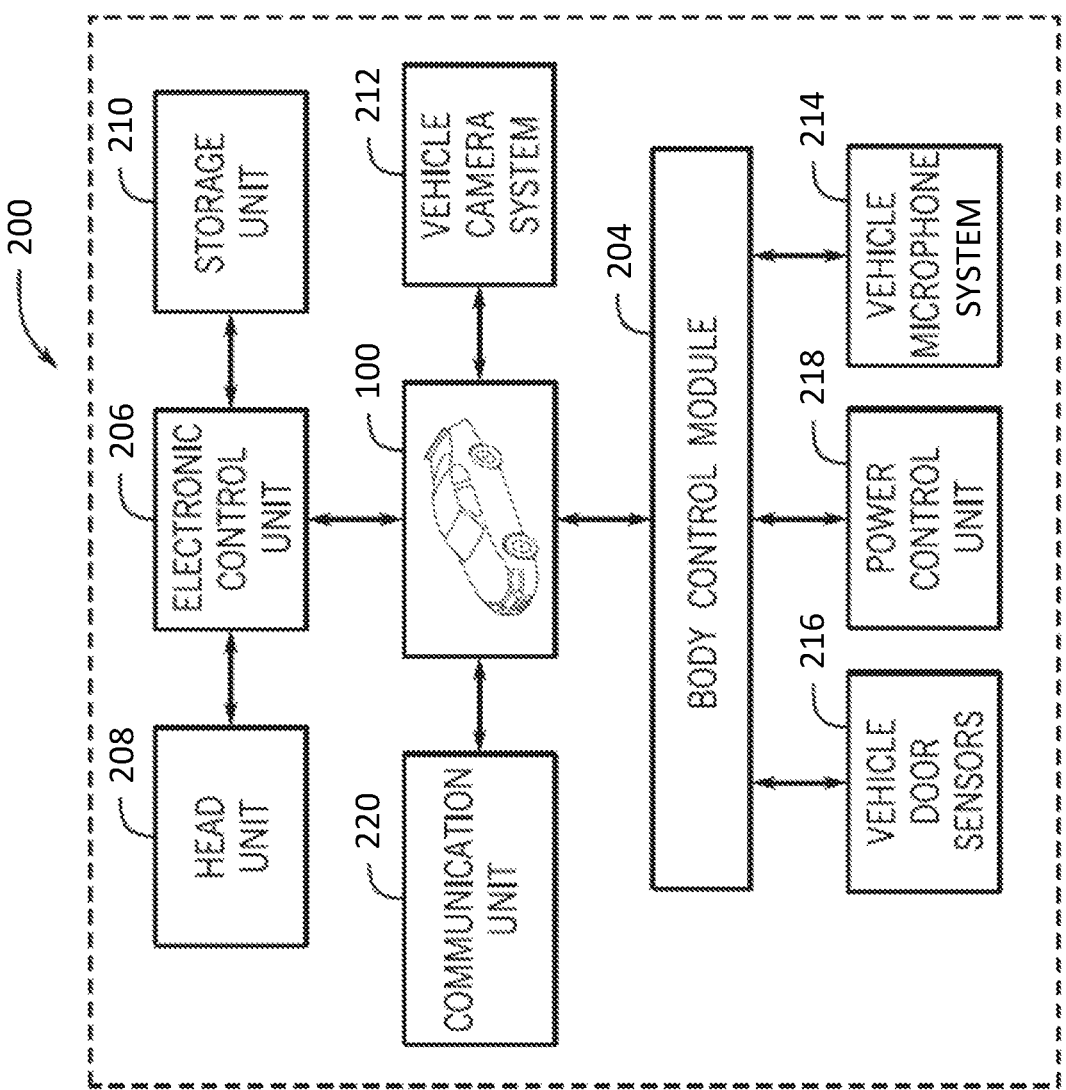
FIG. 2 is an illustrative view of an environment of the VOM system within the vehicle according to some examples of the present disclosure.
Figure 2:
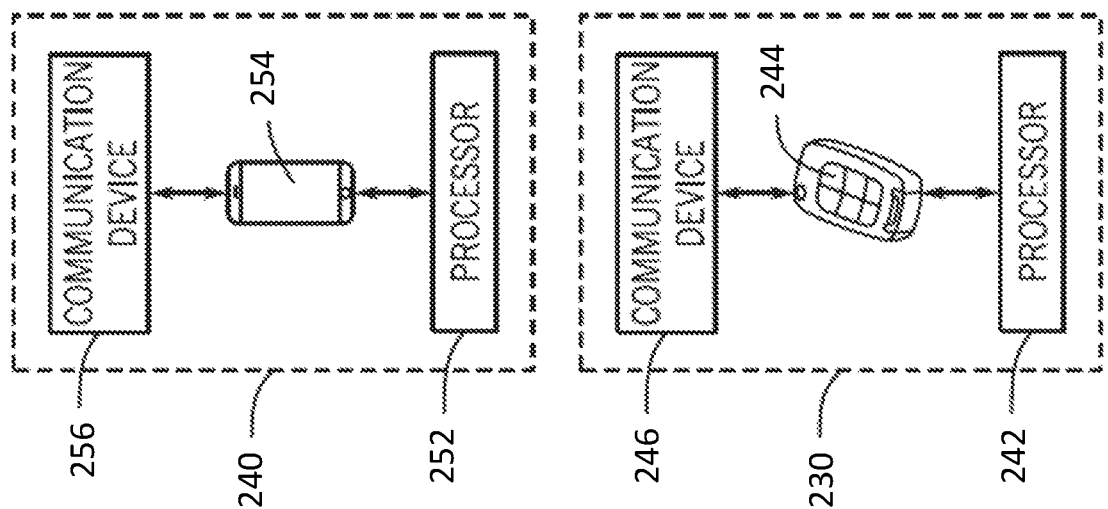

FIG. 2 shows a vehicle occupant monitor (VOM) system 200 in a vehicle 100 to notify an operator of the vehicle 100 of at least a possibility of an existence of one or more passengers (i.e., non-operator occupants) in the cabin 102 of the vehicle 100. The VOM system 200 may be utilized, for example, to provide an alert to an operator of the vehicle 100 upon determining that a door is opened and/or closed when the operator is not in or near the vehicle 100. The components of the environment, as well as the components of other systems, hardware architectures, and software architectures discussed herein, may be combined, omitted, or organized into different architectures for various examples.

Generally, the vehicle 100 includes a body control module (BCM) 204 that may be operably connected to an electronic control unit (ECU) 206 that executes instructions provided by the BCM 204. The BCM 204 and the ECU 206 may each include a processor (not shown), a memory (not shown), a disk (not shown), and an input/output (I/O) interface (not shown), which are each operably connected for computer communication via a bus (not shown). The respective I/O interface provides software and hardware to facilitate data input and output between the components of the BCM 204 and the ECU 206 and other components, networks, and data sources, of the VOM system 200.

As discussed in more detail below, the VOM system 200 may provide the operator of the vehicle 100 with one or more types of alerts. In some examples, the BCM 204 may receive one or more inputs and determine at least a possibility of an existence of one or more passengers (e.g., children, pets) in the cabin 102 based on the inputs. The BCM 204 may then accordingly provide a respective alert to the operator of the vehicle 100 based on instructions that are provided to one or more components of the vehicle 100 through the ECU 206. For example, the VOM system 200 may be activated based on a state of one or more doors 110 of the vehicle 100 and notify the operator of the vehicle 100 to check the vehicle 100 for the one or more passengers.

In addition to the BCM 204 and the ECU 206, the components of the vehicle 100 of the VOM system 200 may include, but may not be limited to, a head unit 208, a storage unit 210, a vehicle camera system 212, a vehicle microphone system 214, vehicle door sensors 216, a power control unit 218, and a communication unit 220. The components of the VOM system 200 may be operably connected to one another via a bus controller area network (not shown) that is included as an interconnected architecture that is operably connected to the components of the VOM system 200.

The BCM 204 may be configured to communicate data to the head unit 208. The head unit 208 may include internal processing memory, an interface circuit, and bus lines for transferring data, sending commands, and communicating with the components of the VOM system 200. In some examples, the head unit 208 may execute one or more operating systems, applications, and/or interfaces that are associated to the vehicle 100. The head unit 208 may be operably connected to one or more vehicle systems and components (not shown) including, but not limited to, a vehicle infotainment system, a vehicle audio system, a vehicle door system, a vehicle light system, and/or a vehicle horn. In some examples, the head unit 208 may utilize one or more vehicle systems and components to provide the one or more alerts to the operator of the vehicle 100.

In some examples, the storage unit 210 may store one or more operating systems, applications, associated operating system data, user interfaces, and the like that are executed by the ECU 206. In some examples, the storage unit 210 may store data (e.g., executable data files) that are associated with the VOM system 200.

In some examples, the VOM system 200 may utilize the vehicle camera system 212 to capture one or more images (e.g., still images, video, etc.). The vehicle camera system 212 may include one or more cameras disposed at one or more locations in the cabin 102. The vehicle camera system 212 may be configured to detect one or more stimuli (e.g., electromagnetic waves) and output image data associated with the stimuli. Image data includes data associated with the one or more images captured by the one or more cameras of the vehicle camera system 212. The vehicle camera system 212 may transmit image data to the BCM 204 to be analyzed by the VOM system 200. For example, the BCM 204 may analyze the image data to determine the presence and/or location of one or more passengers and/or objects in the cabin 102.

In some examples, the VOM system 200 may utilize the vehicle microphone system 214 to capture audio. The vehicle microphone system 214 may include one or more microphones disposed at one or more locations in the cabin 102. The vehicle microphone system 214 may be configured to detect one or more stimuli (e.g., sound) and output audio associated with the stimuli. Audio data includes data associated with the audio captured by the one or more microphones of the vehicle microphone system 214. The vehicle microphone system 214 may transmit audio data to the BCM 204 to be analyzed by the VOM system 200. For example, the BCM 204 may analyze the audio data to determine the presence and/or location of one or more passengers and/or objects in the cabin 102.

In some examples, the vehicle door sensors 216 may be disposed at each of the doors 110 of the vehicle 100. The vehicle door sensors 216 may be configured to detect the opening, closing, locking, and/or unlocking of each of the respective doors 110 and/or determine a door state of one or more doors 110. Moreover, the vehicle door sensors 216 may be configured to detect or determine whether a door 110 is opened and/or closed using an exterior door handle 112 (e.g., an "outer handle") and/or an interior door handle 112 (e.g., an "inner handle"). The vehicle door sensors 216 may transmit data indicative of the door state of one or more doors 110 to the BCM 204 to be analyzed by the VOM system 200. For example, the BCM 204 may analyze the data to determine whether a door 110 is open, closed, locked, and/or unlocked, and/or whether an exterior door handle 112 or interior door handle 112 is used to open and/or close the door 110.

In some examples, the power control unit 218 may be configured to detect the disabling and/or enabling of an engine of the vehicle 100 and/or determine an engine state of the vehicle 100. The power control unit 218 may include a push-start button configured to move the engine state of the vehicle 100 between disabled and enabled. The power control unit 218 may transmit data indicative of the engine state of the vehicle 100 to the BCM 204 to be analyzed by the VOM system 200. For example, the BCM 204 may analyze the data to determine whether the engine of the vehicle 100 is disabled or enabled.

In some examples, the communication unit 220 may be configured to provide wireless computer communications utilizing various protocols to communicate internally with the plurality of components of the vehicle 100 and/or externally with one or more external devices, such as a portable device 230 and/or a mobile device 240 used by the operator of the vehicle 100. Generally, these protocols include a wireless system (e.g., IEEE 802.11 (Wi-Fi), IEEE 802.15.1 (Bluetooth®)), a near field communication (NFC) system (e.g., ISO 23157), a local area network (LAN), and/or a point-to-point system. The communication unit 220 may allow connection of one or more portable devices 230 and/or mobile devices 240 to the vehicle 100 to allow computer communication between components of the portable devices 230 and/or mobile devices 240 and the components of the vehicle 100.

Portable devices 230 may include a remote device such as a key fob that is pre-associated with the vehicle 100. A portable device 230 includes a processor 242 for computing, one or more input buttons 244 to provide inputs, and a communication device 246 for transmitting and/or receiving non-transitory signals. For example, the communication device 246 may be configured to transmit and receive one or more radio-frequency signals (RF signals) between the vehicle 100 and the portable device 230. In some examples, the communication device 246 may be configured to emit or transmit a unique low-frequency signal and/or device identifier data that may be used to uniquely identify the portable device 230.

The communication unit 220 of the vehicle 100 may be configured to determine if the portable device 230 is located within or outside of one or more predetermined distance thresholds of the vehicle 100 based on signals sent to and/or received from the portable device 230. For example, the BCM 204 may be configured to determine a signal strength (RSSI) value and/or a time of flight (TOF) value associated with one or more signals communicated by the portable device 230 to determine the presence of the portable device 230 within or outside of the predetermined distance threshold of the vehicle 100. Such a determination may be used by the BCM 204 to determine if the portable device 230 is located within or outside of the predetermined distance of the vehicle 100.

In some examples, the portable device 230 allows the operator to move the engine state of the vehicle 100 from disabled to enabled (e.g., start an engine of the vehicle 100) by pressing the push-start button of the power control unit 218 while the portable device 230 is within one or more predetermined distance thresholds of the vehicle 100 (e.g., inside the cabin 102). In some examples, the portable device 230 allows the operator to move a door state of one or more doors 110 between unlocked and locked by pressing an input button 244 of the portable device 230 (e.g., a "lock" input button 244 and/or an "unlock" input button 244) while the portable device 230 is within one or more predetermined distance thresholds of the vehicle 100. Additionally, one or more doors 110 may be moved from the locked state to the unlocked state when an exterior door handle 112 is used to open a door 110 while the portable device 230 is within one or more predetermined distance thresholds of the vehicle 100 (e.g., at or near the door 110).

The communication unit 220 of the vehicle 100 may be utilized to communicate data between the BCM 204 of the vehicle 100 and one or more mobile devices 240 that execute an accompanying VOM application (not shown). In some examples, the mobile devices 240 may utilize the VOM application in certain circumstances to provide the one or more alerts to the operator of the vehicle 100.

Mobile devices 240 may include, without limitation, a handheld device, a mobile device, a smart phone, a laptop, a tablet, and/or an e-reader. The mobile devices 240 may include a computing device including a processor 252 for computing, a display screen 254 (e.g., touchscreen) to present info and/or provide inputs, and a communication device 256 for transmitting and/or receiving non-transitory signals. For example, the communication device 256 may be configured to transmit and receive one or more radio-frequency signals (RF signals) between the vehicle 100 and the mobile device 240. In some examples, the communication device 256 may be configured to emit or transmit a unique low-frequency signal and/or device identifier data that may be used to uniquely identify the portable device 230.

II. Vehicle Occupant Monitoring and Associated Methods

An overview of exemplary processes of enabling vehicle occupant monitoring and providing one or more alerts associated with vehicle occupant monitoring by the VOM system 200 will now be discussed with continued reference to FIG. 1 and FIG. 2. For example, the BCM 204 may notify the operator of the vehicle 100 to check the vehicle 100 for one or more passengers when there is a possibility of a presence of one or more passengers and/or objects in the cabin 102 based on instructions that are provided to one or more components of the vehicle 100 through the ECU 206.

In some examples, the BCM 204 and/or ECU 206 may execute instructions to communicate with one or more of the components of the VOM system 200 and/or cause a function or action via one or more components of the VOM system 200. The BCM 204 and/or ECU 206 may include logic, a software controlled microprocessor, and a memory device containing executing instructions that may be utilized to store data (e.g., at the storage unit 210).

In some examples, the BCM 204 may store or retrieve a time stamp associated with data pertaining to the presence of one or more passengers and/or objects (e.g., portable device 230) in the cabin 102; data pertaining to the opening, closure, locking, and/or unlocking of one or more doors 110; and/or data pertaining to the engine state of the vehicle 100. The time stamp may be accessed and analyzed against one or more other time stamps to provide functions of the VOM system 200. In some examples, the BCM 204 may generate the time stamps using a system clock that may be executed by the ECU 206.

In some examples, the VOM system 200 may be activated based on a state of one or more doors 110 of the vehicle 100. For example, when the vehicle door sensors 216 detect that an exterior door handle 112 is used to open a door 110, the vehicle door sensors 216 may transmit one or more signals to the BCM 204. In some examples, the BCM 204 may transmit the at least one type of alert based on a time that the exterior door handle 112 is used to open the door 110. The at least one type of alert may be transmitted, for example, when the time that the exterior door handle 112 is used to open the door 110 satisfies a predetermined threshold. For another example, the at least one type of alert may be transmitted when a door 110 has been in an open state for a predetermined duration. In some examples, the BCM 204 may determine or identify the time that the exterior door handle 112 was used to open the door 110 by communicating with the vehicle door sensors 216 and/or storage unit 210. Upon determining that the exterior door handle 112 is used to open a door 110 and/or a door 110 has been in the open state for at least the predetermined duration, the VOM system 200 may determine whether to provide at least one type of alert to the mobile device 240 associated with the vehicle 100.

In some examples, the VOM system 200 may provide at least one type of alert to the mobile device 240 based on a key fob state of the vehicle 100. The communication unit 220 may transmit the at least one type of alert to the mobile device 240, for example, if the key fob state of the vehicle 100 is undetected when the exterior door handle 112 is used to open the door 110. In some examples, the key fob state of the vehicle 100 may be undetected when the portable device 230 is located outside of a predetermined distance of the vehicle 100. The portable device 230 may be determined to be located outside of the predetermined distance, for example, if no signal from a portable device 230 is detected, if the signal strength value of a detected signal is below a predetermined signal strength threshold, and/or if the time of flight value of the detected signal exceeds a predetermined time of flight threshold. The BCM 204 may be configured to evaluate a signal and determine a RSSI value and/or a TOF value associated with the signal, and evaluate the RSSI value and/or TOF value against one or more RSSI value thresholds and/or one or more TOF value thresholds to determine whether the portable device 230 is within or outside of the predetermined distance threshold of the vehicle 100.

In some examples, the BCM 204 may communicate with the communication unit 220 to determine the key fob state of the vehicle 100. To determine the key fob state of the vehicle 100, the communication unit 220 may transmit one or more signals to the portable device 230 and/or scan for a unique low-frequency signal or device identifier data associated with the portable device 230. Additionally or alternatively, the BCM 204 may communicate with the storage unit 210 to retrieve a time stamp associated with the latest key fob state and/or the latest detected signal from a portable device 230, and determine the key fob state based on the time stamp. In some examples, the communication unit 220 transmit the at least one type of alert if a duration of the key fob state of the vehicle 100 satisfies a predetermined threshold.

In some examples, the VOM system 200 may provide at least one type of alert to the mobile device 240 based on an engine state of the vehicle 100. The communication unit 220 may transmit the at least one type of alert to the mobile device 240, for example, if the engine state of the vehicle 100 is disabled when the exterior door handle 112 is used to open the door 110.

In some examples, the BCM 204 may communicate with the power control unit 218 to determine the engine state of the vehicle 100. Additionally or alternatively, the BCM 204 may communicate with the storage unit 210 to retrieve a time stamp associated with the latest engine state, and determine the engine state of the vehicle 100 based on the time stamp. In some examples, the communication unit 220 transmit the at least one type of alert if a duration of the engine state satisfies a predetermined threshold.

In some examples, the BCM 204 determines the presence and/or location of one or more passengers and/or objects in the cabin 102. The BCM 204 may activate and utilize a vehicle sensor system (e.g., vehicle camera system 212, vehicle microphone system 214), for example, to detect one or more parameters of the cabin 102 of the vehicle 100. The BCM 204 may communicate with the vehicle camera system 212 and/or the vehicle microphone system 214 to capture images and/or audio and provide respective data to the BCM 204.

Based on the image data and/or audio data, the BCM 204 may determine if there is a presence of one or more passengers and/or objects in the cabin 102. The BCM 204 may analyze image data and/or audio data using logic to determine whether at least one passenger is located within the cabin 102 of the vehicle 100. In some examples, the images captured from within the cabin 102 may be within one or more predetermined size, shape, and texture thresholds that may be associated with the presence of one or more passengers. For example, the one or more predetermined size, shape, and texture thresholds may be associated with the size, shape, and texture of one or more images that may pertain to the movement, size, shape, and/or location of the one or more passengers in the cabin 102 that is distinguishable from parts of the vehicle 100 (e.g., seats, etc.). In some examples, the audio captured from within the cabin 102 may be within one or more predetermined pitch and frequency thresholds that may be associated with the presence of one or more passengers. For example, the one or more predetermined pitch and frequency thresholds may be associated with the pitch and frequency of one or more sounds that may pertain to the movement, voice/sounds (e.g. voice of a child), and/or location of the one or more passengers in the cabin 102 that is distinguishable from ambient noise of the vehicle 100.

If the presence of one or more passengers and/or objects is detected in the cabin 102, the BCM 204 may access the storage unit 210 and store a detection flag that includes one or more indications of the passengers and/or objects in the cabin 102. The detection flag may include data that pertains to the determined presence and location of the passengers and/or objects in the cabin 102. If the BCM 204 does not detect the presence of one or more passengers and/or objects in the cabin 102 based on the analysis of the image data and/or audio data, a non-detection flag may be stored in the storage unit 210. If a passenger is located within the cabin 102 of the vehicle 100, the at least one type of alert may be generated to include a warning notification regarding the passenger located within the cabin 102 of the vehicle 100.

Figure 3:
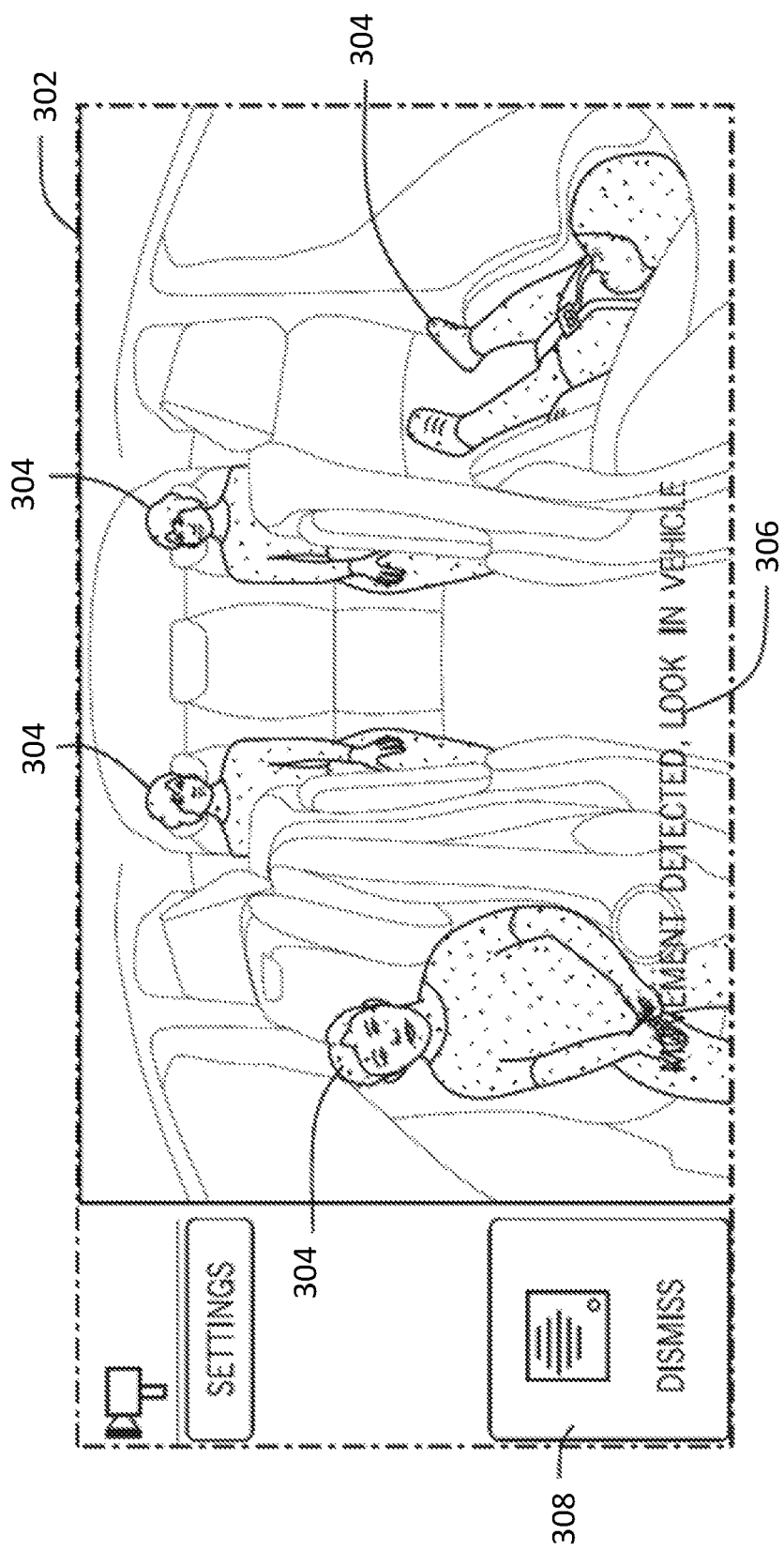
FIG. 3 is an illustrative example of a vehicle occupant interface of the VOM system presented on a display screen according to some examples of the present disclosure.

The BCM 204 may employ the communication unit 220 to communicate the at least one alert to the mobile device 240. In some examples, the mobile device 240 includes a VOM application that is executed on the mobile device 240 to analyze data received from the communication unit 220 and present a vehicle occupant interface 302 (shown in FIG. 3) via the display screen 254 of the mobile device 240.

The display screen 254 may present one or more types of alerts that may include one or more types of interface layouts and configurations that are presented as part of the vehicle occupant interface 302. In some examples, the VOM system 200 may present a video/image feed overlaid with one or more highlighted locations 304 (shown in FIG. 3) at one or more locations in the cabin 102 where the presence of one or more passengers are detected (e.g., as stored in the detection indication data flag) by the BCM 204. The video/image feed may also be overlaid with one or more user interface notifications 306. Such user interface notifications 306 (shown in FIG. 3) may be presented based on the determination of passengers (e.g., as opposed to objects) in the cabin 102. In some examples, a dismiss user interface input button 308 (shown in FIG. 3) may be presented to the operator to allow the operator to dismiss the user interface notifications 306 and deactivate the presentation of the vehicle occupant interface 302.

In some examples, the VOM system 200 may provide at least one type of alert to the mobile device 240 based on a time that a previous alert was transmitted (e.g., the time that an alert was last communicated). The communication unit 220 may transmit the at least one type of alert to the mobile device 240, for example, if the time that the previous alert was transmitted satisfies a predetermined threshold (e.g., more than five minutes ago). In some examples, the BCM 204 may communicate with the communication unit 220 to determine when a previous alert was transmitted. Additionally or alternatively, the BCM 204 may communicate with the storage unit 210 to retrieve a time stamp associated with the time that the previous alert was transmitted, and determine when the previous alert was transmitted based on the time stamp.

In some examples, the BCM 204 may communicate with the head unit 208 to actuate one or more doors 110. For example, a door 110 may be unlocked and/or opened to allow the passenger to exit or leave the vehicle 100. In some examples, the BCM 204 may communicate with the head unit 208 to employ one or more lights (e.g., headlights), one or more speakers, and/or a horn of the vehicle 100 to bring attention as to the existence of the passengers/objects in the cabin 102. For example, the lights and/or horn may be actuated to provide repeated flashing, buzzes/chimes, and/or honks/beeps, respectively.

Figure 4:
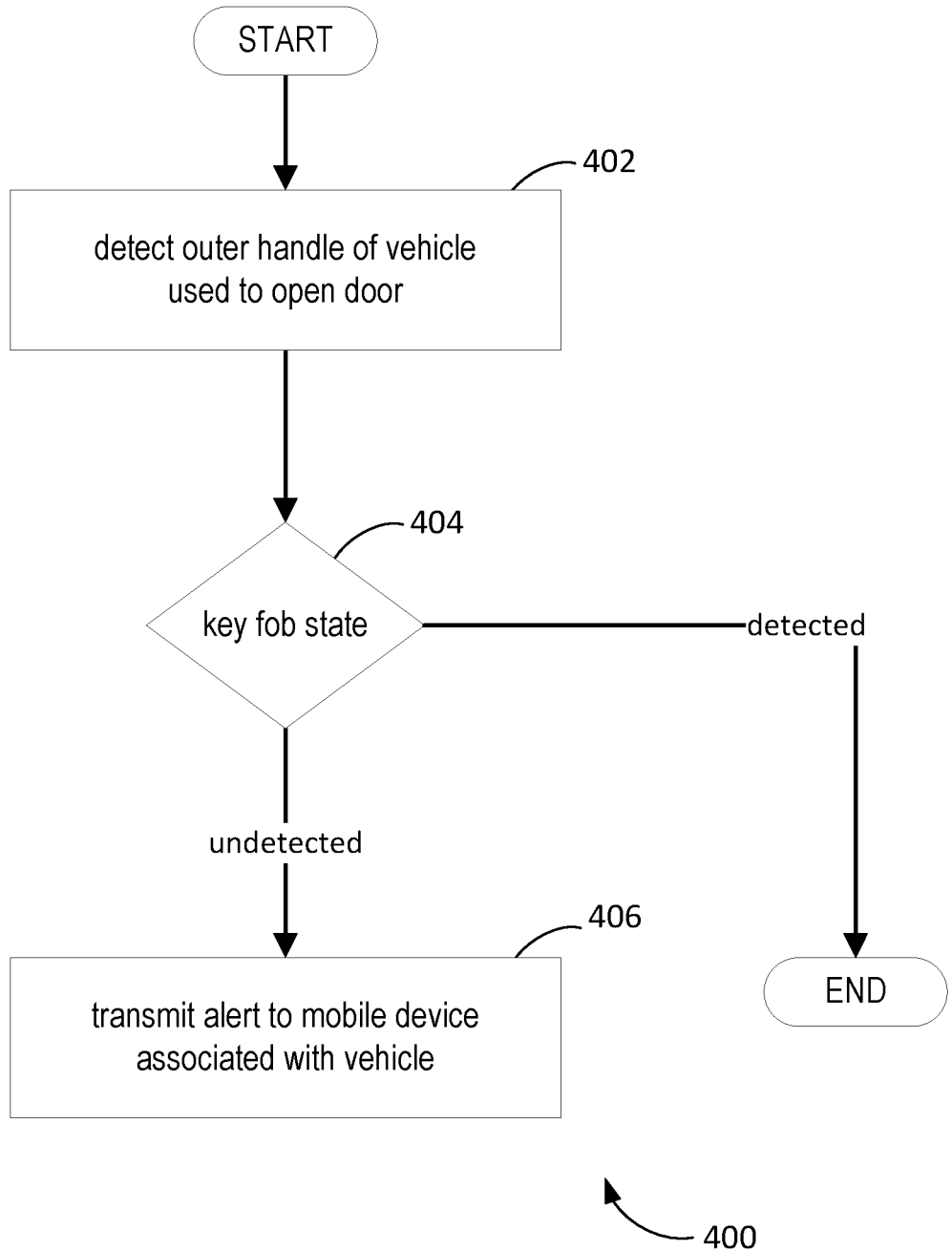
FIG. 4 is an illustrative process flow diagram of a method executed by the VOM system to provide one or more types of alerts according to some examples of the present disclosure.

FIG. 4 shows various operations of a method 400 executed by the VOM system 200 to determine whether to transmit at least one type of alert to a mobile device 240 associated with the vehicle 100. The method 400 of FIG. 4 will be described with reference to the components of FIG. 1 and FIG. 2, though it is to be appreciated that the method 400 of FIG. 4 may be used with other systems and/or components. The method 400 may begin at operation 402, wherein the method 400 may include detecting a door signal associated with one or more vehicle door sensors 216. The door signal may be indicative of an outer handle 112 of the vehicle 100 being used to open a door 110.

In some examples, the vehicle door sensors 216 may monitor the doors 110 of the vehicle 100 to determine when one or more of the doors 110 of the vehicle 100 are changed between a closed state and an open state, and transmit door state data to the BCM 204 with each change. For example, upon determining that one or more of the doors 110 are changed from the closed state to the open state, the vehicle door sensors 216 may communicate door state data indicating a time of the opening of the one or more doors 110 of the vehicle 100. Conversely, upon determining that one or more of the doors 110 are changed from the open state to the closed state, the vehicle door sensors 216 may communicate door state data indicating a time of the closure of the one or more doors 110 of the vehicle 100. In some examples, the BCM 204 may determine that an exterior door handle 112 was used to open or close the one or more of the doors 110. For example, the BCM 204 may assign a higher confidence of a potential breach of the vehicle 100 if an exterior door handle 112 was used to open a door 110 than if an interior door handle 112 was used to open the door 110.

The method 400 may proceed to operation 404, wherein the method 400 may include communicating with a key fob sensor (e.g., at the communication unit 220) to determine a key fob state of the vehicle 100. If the portable device 230 is determined to be located inside of a predetermined distance of the vehicle 100, the communication unit 220 may provide an indication that the key fob state of the vehicle 100 is detected. Alternatively, if the portable device 230 is determined to be located outside of the predetermined distance of the vehicle 100, the communication unit 220 may provide an indication that the key fob state of the vehicle 100 is undetected.

In some examples, the communication unit 220 may monitor a predetermined area (e.g., cabin 102) to determine when the key fob state of the vehicle 100 is changed between a detected state and an undetected state, and transmit key fob state data to the BCM 204 with each change. For example, upon determining that the key fob state of the vehicle 100 is changed from the undetected state to the detected state, the communication unit 220 may communicate key fob state data indicating a time of the detection of the portable device 230. Conversely, upon determining that the key fob state of the vehicle 100 is changed from the detected state to the undetected state, the communication unit 220 may communicate key fob state data indicating a time of the non-detection of the portable device 230. As an illustrative example, if the operator exits the vehicle 100 and walks away from the vehicle 100 as he/she carries the portable devices 230, the portable device 230 may be carried outside of the predetermined distance of the vehicle 100. Upon the portable device 230 being carried outside the predetermined distance of the vehicle 100, the BCM 204 may determine that the portable device 230 is outside of the predetermined distance of the vehicle 100 based on the comparison of RSSI value(s) and/or TOF value(s) against the RSSI value threshold(s) and/or the TOF value threshold(s). In some examples, the BCM 204 may determine a difference between the time of the non-detection of the portable device 230 and the time of opening of the one or more doors 110 of the vehicle 100. For example, the BCM 204 may assign a higher confidence of a potential breach of the vehicle 100 if the difference is greater than a predetermined time threshold (e.g., five minutes).

The method 400 may include communicating with the power control unit 218 to determine an engine state of the vehicle 100. If the vehicle ignition has been enabled, the power control unit 218 may provide an indication that the engine state of the vehicle 100 is enabled. Alternatively, if the vehicle ignition has been disabled, the power control unit 218 may provide an indication that the engine state of the vehicle 100 is disabled.

In some examples, the power control unit 218 may monitor an engine of the vehicle 100 to determine when the engine state of the vehicle 100 is changed between an enabled state and a disabled state, and transmit engine state data to the BCM 204 with each change. For example, upon determining that the engine state of the vehicle 100 is changed from the disabled state to the enabled state, the power control unit 218 may communicate engine state data indicating a time of the enabling of the engine. Conversely, upon determining that the engine state of the vehicle 100 is changed from the enabled state to the disabled state, the power control unit 218 may communicate engine state data indicating a time of the disabling of the engine. In some examples, the BCM 204 may determine a difference between the time of the disabling of the engine and the time of opening of the one or more doors 110 of the vehicle 100. For example, the BCM 204 may assign a higher confidence of a potential breach of the vehicle 100 if the difference is greater than a predetermined time threshold (e.g., five minutes).

In some examples, the BCM 204 may communicate with the vehicle camera system 212 and/or vehicle microphone system 214 to determine if one or more passengers are located in the cabin 102. If one or passengers are not located in the cabin 102, the vehicle camera system 212 and/or vehicle microphone system 214 may provide an indication that no passengers were detected (e.g., a non-detection flag). Alternatively, if one or passengers are located in the cabin 102, the vehicle camera system 212 and/or vehicle microphone system 214 may provide an indication that one or more passengers were detected (e.g., a detection flag).

In some examples, the vehicle camera system 212 may monitor the cabin 102 of the vehicle 100 to determine when the vehicle 100 is changed between an empty state and an occupied state, and transmit cabin state data to the BCM 204 with each change. For example, upon determining that the cabin state of the vehicle 100 is changed from the occupied state to the empty state, the vehicle camera system 212 and/or vehicle microphone system 214 may communicate cabin state data indicating a time of passengers exiting the vehicle 100. Conversely, upon determining that the cabin state of the vehicle 100 is changed from the empty state to the occupied state, the vehicle camera system 212 and/or vehicle microphone system 214 may communicate cabin state data indicating a time of one or more passengers entering the vehicle 100. In some examples, the BCM 204 may determine a difference between the time of the one or more passengers entering the vehicle 100 and the time of opening of the one or more doors 110 of the vehicle 100. For example, the BCM 204 may assign a higher confidence of a potential breach of the vehicle 100 if the difference is greater than a predetermined time threshold (e.g., five minutes).

The method 400 may proceed to operation 406, wherein the method 400 may include transmitting at least one type of alert to a mobile device 240 associated with the vehicle 100. An alert may be transmitted, for example, when the door 110 is opened using an exterior door handle 112 while the engine state is disabled, the engine state has been disabled for greater than a predetermined engine time threshold (e.g., five minutes), the key fob state is undetected, the key fob state has been undetected for greater than a predetermined key fob time threshold (e.g., five minutes), the cabin state is occupied, and/or another alert has not been transmitted within a predetermined alert time threshold (e.g., five minutes). For another example, an alert may be transmitted when the door 110 is in an open state for greater than a predetermined duration while the engine state is disabled, the engine state has been disabled for greater than a predetermined engine time threshold (e.g., five minutes), the key fob state is undetected, the key fob state has been undetected for greater than a predetermined key fob time threshold (e.g., five minutes), the cabin state is occupied, and/or another alert has not been transmitted within a predetermined alert time threshold (e.g., five minutes).

The BCM 204 may employ the communication unit 220 to communicate the at least one alert to the mobile device 240. In some examples, the at least one alert is presented using a VOM application executed on the mobile device 240. For example, the VOM application may analyze the data received from the communication unit 220 and present the vehicle occupant interface 302 via a display screen 254 of the mobile device 240. In some examples, the vehicle occupant interface 302 may be presented with an image/video feed of the cabin 102 of the vehicle 100, which may be overlaid with one or more highlighted locations 304, user interface notifications 306, and/or a dismiss user interface input button 308. The BCM 204 may communicate data to the VOM application based on communication between the communication unit 220 and the communication device 256. The communicated data may include one or more commands to initiate a video/audio/vibratory alert via the display screen 254/speaker(s), and/or motor(s), respectively, of the mobile device 240.

The dismiss user interface input button 308 may be presented to allow the operator to dismiss the user interface notifications 306 and/or deactivate the presentation of the vehicle occupant interface 302. If the dismiss user interface button 308 is used, the mobile device 240 may utilize the communication device 256 to communicate respective data associated with the input to the BCM 204 via the communication unit 220. In some examples, the BCM 204 may acknowledge that the dismiss user interface button 308 was used based on the receipt of the respective data associated with the input from the mobile device 240. In some examples, the vehicle occupant interface 302 may provide the alert on the mobile device 240 for a predetermined number of times at predetermined durations (e.g., 5 times for 20 seconds each) until the BCM 204 determines that the dismiss user interface input button 308 is used. Additionally or alternatively, the vehicle occupant interface 302 may provide the alert until the door state changes, the key fob state is detected, the engine state is enabled, and/or the cabin state is empty. In some examples, the vehicle occupant interface 302 may provide at least one type of alert on condition that another alert has not been transmitted for a predetermined threshold (e.g., five minutes).

It should be apparent from the foregoing description that various examples may be implemented in hardware. Furthermore, various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

When introducing elements, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing vehicle occupant monitoring within a vehicle, comprising:
   detecting that an outer handle of the vehicle is used to open a door;
   upon detecting that the outer handle of the vehicle is used to open the door, determining a key fob state of the vehicle; and
   on condition that the key fob state of the vehicle is undetected when the outer handle of the vehicle is used to open the door, transmitting at least one type of alert to a mobile device associated with the vehicle.

2. The computer-implemented method of claim 1, further comprising determining a time that the outer handle of the vehicle was used to open the door, wherein the at least one type of alert is transmitted on condition that the time that the outer handle of the vehicle was used to open the door satisfies a predetermined threshold.

3. The computer-implemented method of claim 1, further comprising determining a duration of the key fob state of the vehicle, wherein the at least one type of alert is transmitted on condition that the duration of the key fob state of the vehicle satisfies a predetermined threshold.

4. The computer-implemented method of claim 1, further comprising determining a time that a previous alert was transmitted, wherein the at least one type of alert is transmitted on condition that the time that the previous alert was transmitted satisfies a predetermined threshold.

5. The computer-implemented method of claim 1, further comprising determining an engine state of the vehicle upon detecting that the outer handle of the vehicle is used to open the door, wherein the at least one type of alert is transmitted on condition that the engine state of the vehicle is disabled when the outer handle of the vehicle is used to open the door.

6. The computer-implemented method of claim 5, further comprising determining a duration of the engine state of the vehicle, wherein the at least one type of alert is transmitted on condition that the duration of the engine state of the vehicle satisfies a predetermined threshold.

7. The computer-implemented method of claim 1, further comprising:
  activating a vehicle sensor system to detect one or more parameters of an interior cabin space of the vehicle;
  determining whether at least one occupant is located within the interior cabin space of the vehicle based on the one or more parameters; and
  on condition that the at least one occupant is located within the interior cabin space of the vehicle, generating the at least one type of alert such that the at least one type of alert includes a warning notification regarding the at least one occupant located within the interior cabin space of the vehicle.

8. A vehicle occupant monitor system comprising:
  a plurality of sensors comprising a door sensor and a key fob sensor;
  a transmitter configured to communicate with a mobile device associated with a vehicle;
  a processor; and
  a memory storing instructions that, when executed by the processor, cause the processor to:
    detect a door signal associated with the door sensor, the door signal indicative of an outer handle of the vehicle being used to open a door;
    upon detecting the door signal, communicate with the key fob sensor to determine a key fob state of the vehicle; and
    on condition that the key fob state of the vehicle is undetected when the outer handle of the vehicle is used to open the door, communicate with the transmitter to transmit at least one type of alert to the mobile device associated with the vehicle.

9. The system of claim 8, wherein the memory stores further instructions that, when executed by the processor, cause the processor to analyze the door signal to determine a time that the outer handle of the vehicle was used to open the door, wherein the processor communicates with the transmitter on condition that the determined time satisfies a predetermined threshold.

10. The system of claim 8, wherein the memory stores further instructions that, when executed by the processor, cause the processor to determine a duration of the key fob state of the vehicle, wherein the processor communicates with the transmitter on condition that the determined duration satisfies a predetermined threshold.

11. The system of claim 8, wherein the memory stores further instructions that, when executed by the processor, cause the processor to determine a time that the processor last communicated with the transmitter to transmit the at least one type of alert to the mobile device associated with the vehicle, wherein the processor communicates with the transmitter on condition that the determined time satisfies a predetermined threshold.

12. The system of claim 8, wherein the plurality of sensors further comprise a power control unit, and the memory stores further instructions that, when executed by the processor, cause the processor to communicate with the power control unit to determine an engine state of the vehicle upon detecting the door signal, wherein the processor communicates with the transmitter on condition that the engine state of the vehicle is disabled when the outer handle of the vehicle is used to open the door.

13. The system of claim 12, wherein the memory stores further instructions that, when executed by the processor, cause the processor to a duration of the engine state of the vehicle, wherein the processor communicates with the transmitter on condition that the duration of the engine state of the vehicle satisfies a predetermined threshold.

14. The system of claim 12, wherein the memory stores further instructions that, when executed by the processor, cause the processor to:
  communicate with the plurality of sensors to detect one or more parameters of an interior cabin space of the vehicle;
  determine whether at least one occupant is located within the interior cabin space of the vehicle based on the one or more parameters; and
  on condition that the at least one occupant is located within the interior cabin space of the vehicle, generating the at least one type of alert such that the at least one type of alert includes a warning notification regarding the at least one occupant located within the interior cabin space of the vehicle.

15. A non-transitory computer readable storage medium storing instructions that, when executed by a computer, cause the computer to:
  detect a door signal indicative of an outer handle of a vehicle being used to open a door;
  upon detecting the door signal, determine a key fob state of the vehicle;
  on condition that the key fob state of the vehicle is undetected when the outer handle of the vehicle is used to open the door, transmit at least one type of alert to a mobile device associated with the vehicle.

16. The non-transitory computer readable storage medium of claim 15 storing further instructions that, when executed by the computer, cause the computer to determine a time that the outer handle of the vehicle was used to open the door, wherein the at least one type of alert is transmitted on condition that the time that the outer handle of the vehicle was used to open the door satisfies a predetermined threshold.

17. The non-transitory computer readable storage medium of claim 15 storing further instructions that, when executed by the computer, cause the computer to determine a duration of the key fob state of the vehicle, wherein the at least one type of alert is transmitted on condition that the duration of the key fob state of the vehicle satisfies a predetermined threshold.

18. The non-transitory computer readable storage medium of claim 15 storing further instructions that, when executed by the computer, cause the computer to determine a time that a previous alert was transmitted, wherein the at least one type of alert is transmitted on condition that the time that the previous alert was transmitted satisfies a predetermined threshold.

19. The non-transitory computer readable storage medium of claim 15 storing further instructions that, when executed by the computer, cause the computer to determine an engine state of the vehicle upon detecting the door signal, wherein the at least one type of alert is transmitted on condition that the engine state of the vehicle is disabled when the outer handle of the vehicle is used to open the door.

20. The non-transitory computer readable storage medium of claim 19 storing further instructions that, when executed by the computer, cause the computer to determine a duration of the engine state of the vehicle, wherein the at least one type of alert is transmitted on condition that the duration of the engine state of the vehicle satisfies a predetermined threshold.

* * * * *